United States Patent [19]
Ferrero

[11] Patent Number: 6,103,279
[45] Date of Patent: Aug. 15, 2000

[54] FOOD PRODUCT COMPRISING A WAFER SHELL AND A CREAMY FILLING WITH A CARAMEL CORE AND PROCESS FOR PRODUCING THE SAME

[75] Inventor: Pietro Ferrero, Rhode-St-Genese, Belgium

[73] Assignee: Soremartec SA, Belgium

[21] Appl. No.: 08/913,423

[22] PCT Filed: Mar. 6, 1996

[86] PCT No.: PCT/EP96/00948

§ 371 Date: Jan. 7, 1998

§ 102(e) Date: Jan. 7, 1998

[87] PCT Pub. No.: WO96/28035

PCT Pub. Date: Sep. 19, 1996

[30] Foreign Application Priority Data

Mar. 15, 1995 [CH] Switzerland .............................. 0731/95

[51] Int. Cl.[7] .................................................. A21D 13/00
[52] U.S. Cl. .............................. 426/94; 426/89; 426/100; 426/101; 426/138; 426/139

[58] Field of Search ................................. 426/89, 94, 138, 426/139, 100, 101

[56] References Cited

FOREIGN PATENT DOCUMENTS

0086319 8/1983 European Pat. Off. .
8802990 5/1988 WIPO .

OTHER PUBLICATIONS

Orlando Sentinel, "New On The Shelf", Jun. 1994.
Fresno Bee, No Trick, Just Lots of Treats, Oct. 1993.
Pittsburgh Press, Here's The Sweet Scoop On 20 Discrict Ice Cream Shops, Jul. 1990.

*Primary Examiner*—Lien Tran
*Attorney, Agent, or Firm*—Rothwell, Figg, Ernst & Manbeck

[57] ABSTRACT

A food product comprising a wafer shell which encloses a mass of hydrated or substantially hydrated, creamy filling. A core of soft caramel is incorporated in the mass of filling and the wafer shell is preferably covered by a continuous coating layer, for example, based on chocolate, possibly with the addition of chopped nuts or another granular substance.

17 Claims, 1 Drawing Sheet

FOOD PRODUCT COMPRISING A WAFER SHELL AND A CREAMY FILLING WITH A CARAMEL CORE AND PROCESS FOR PRODUCING THE SAME

This application is a 371 filing of PCT/EP96/00948 filed Mar. 6, 1996.

BACKGROUND OF THE INVENTION

1. Field of the Invention

The present invention relates to a structure for a food product with a shell of "cialda" (or wafer, the two terms being substantially equivalent) and a creamy filling.

2. Problems Addressed by the Invention

Products of the type specified above are widely known in the art, evidence thereof being provided, for example, by the documents EPA-A-0 064 155 and EP-A-0 083 324.

The invention has been developed with specific attention to its possible use in the production of semi-cold food products.

During the production of this type of product, it is necessary to take account of the difficulty of putting a wafer layer into contact with a mass which is hydrated (or substantially hydrated, that is, which may have a certain moisture content) particularly when the mass has a water content which is harmful to the wafer casing. The intrinsic moisture of the mass of filling in fact tends to migrate towards the wafer shell giving rise to adverse effects such as softening, going mouldy and fermentation processes, etc.

For a general discussion of the problems inherent in the production of wafer layers and their use in contact with creamy layers, reference may usefully be made to the following bibliographical documents:

"Ergebnisse von Untersuchungen hinsichtlich des Einflusses der Feuchtekonzentration auf die Scherfestigkeit von gefüllten Waffeln" by A. Schaller and E. Mohr, published in "Lebensmittel und Ernährung", May 1976, pp.120 et seq;

"Probleme bei der Produktion von schaumgefüllten Waffeln" by Werner Richter, published in "Bäcker und Konditor", vol. 10, 1970, pp. 301 et. seq;

"Verhalten von Waffelblättern mit feuchten Füllungen" by Helmut Löser, published in Kakao+Zucker, 9/1981, pp. 243 et seq; and "Observations on lipolytic spoilage of wafer fillings at relative humidities below the limit for mould growth" by M. Lubienleki-von Scherlhorn and A. Purr, published in Rev. Ing. Choc. (RIC) 23 (1968) Nov. 11, 1968, pp. 426 et seq.

In this general field, the prevalent tendency is to avoid, as far as possible, wafer layers coming into contact with masses of hydrated filling except with the interposition of separating layers (for example, of chocolate) which can prevent the moisture from migrating towards the wafer layer; in this connection see, for example, EP-A-0 064 155 already mentioned above.

Another solution in current use gets around the problem with the use, for the wafer filling, of masses which are substantially anhydrous in the sense that any moisture content in the filling is reduced to a level such as not to cause softening of the wafer.

Substantially intermediate between the solutions described above is the solution described in the U.S. Pat. No. 4,545,997, in which wafer sheets are baked and their moisture content is then substantially increased. A layer of cream having a moisture content less than that of the wafer sheets is then applied to the sheets.

The present invention also addresses the problem of producing a structure for a food product with a wafer shell and a creamy filling, overcoming the intrinsic limitations of the previous solutions.

According to the present invention, this object is achieved by virtue of a structure for a food product having the specific characteristics recited in claim 1. Advantageous developments of the invention form the subject of the dependent claims 2 to 11.

SUMMARY OF THE INVENTION

In summary, the solution according to the invention provides for a hydrated, creamy filling (constituted, for example, by a milk-based cream) to be put directly in contact with the wafer shell. This takes place without the provision of any intermediate isolating layer but rather with the provision of a soft caramel core in the mass of filling, the semi-finished wafer, the filling and the soft caramel being formulated in a manner such that a moisture-driven migration takes place between them and brings about the desired structural consistency in the finished product. The wafer shell preferably forms a closed casing which surrounds the mass of filling in which the soft caramel core is disposed. More preferably, the shell is completely covered on its outer surface, and hence in a position opposite the filling, by a covering mass (a coating) of a material (typically chocolate, possibly with the addition of chopped hazelnuts).

BRIEF DESCRIPTION OF THE DRAWINGS

The invention will now be described purely by way of non-limiting example, with reference to the appended drawings, in which.

DETAILED DESCRIPTION OF THE PREFERRED EMBODIMENTS

Figure 1:
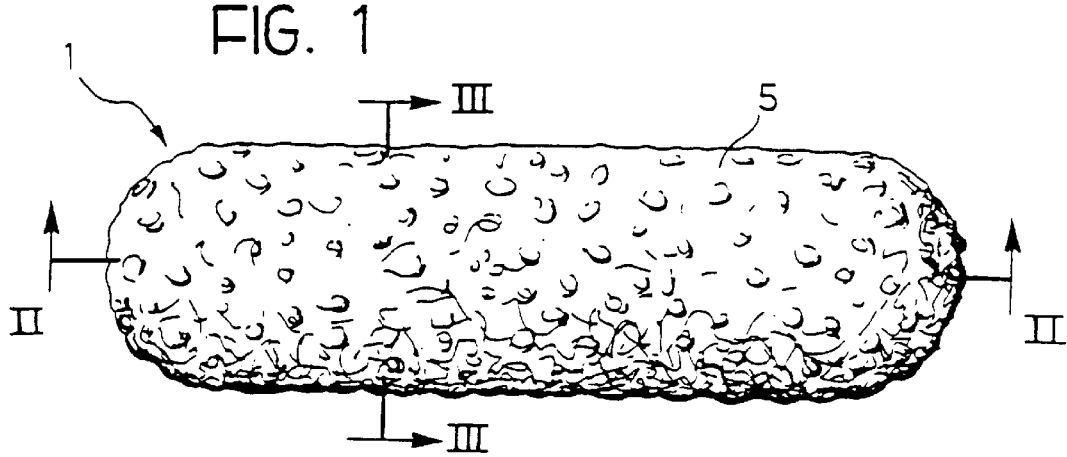
FIG. 1 is an overall view of a product in which the structure according to the invention is used.
Figure 2:
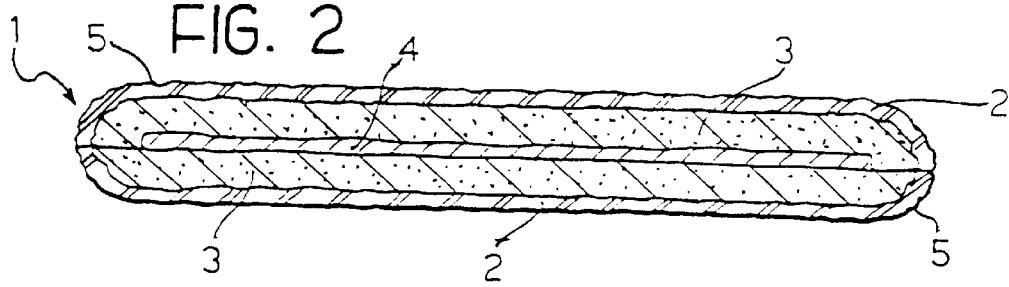
FIG. 2 is a section taken on the line II—II of FIG. 1.
Figure 3:
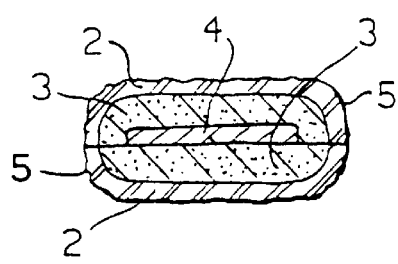
FIG. 3 is a section taken on the line III—III of FIG. 1.
Figure 4:
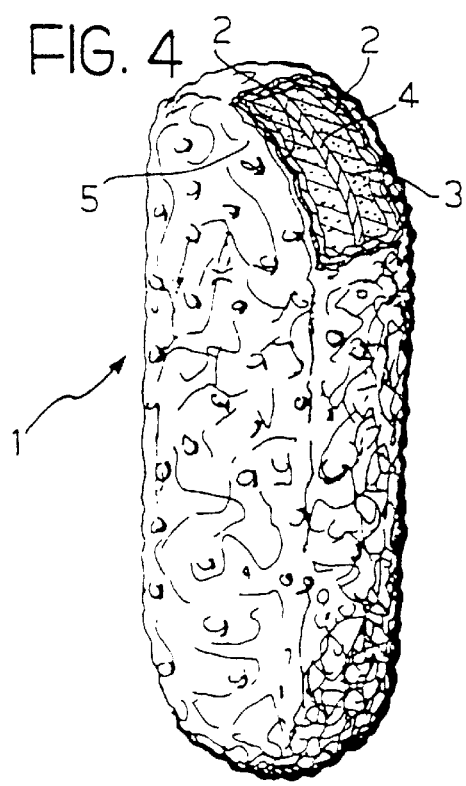
FIG. 4 is a perspective view which shows the product according to the invention during consumption.

In the appended drawings, a food product such as a semi-cold confectionery product which, in one possible embodiment, is approximately in the shape of a flattened bar with rounded ends, is generally indicated 1.

The overall shape of the product 1 is dictated essentially by the shape of a wafer shell constituted by two dish-like half-shells 2 having opening portions of complementary shape. The two half-shells 2 can thus be coupled facing one another so as together to define a closed casing.

The techniques for the production of wafer half-shells such as the half-shells indicated 2 in the appended drawings are widely known in the art and form the subject of very extensive literature. A detailed description of these techniques herein is therefore wholly superfluous.

The space inside the product 1 defined by the two wafer half-shells 2 receives a filling 3 of a mass of hydrated, creamy filling. For example, this may be a milk-based cream having a formulation of the type given below:

| Fresh pasteurized milk | 28–32% |
| --- | --- |
| Sucrose | 27–30% |
| Refined vegetable fat | 20–24% |
| Skimmed milk powder | 12–14% |
| Anhydrous cows' butter | 4–5 % |
| Flavourings | 1% |

This is therefore a substantially hydrated mass of filling having a moisture content of the order of 25–30% by weight and hence much greater than the characteristic moisture content of the wafer shells (typically of the order of 3–6% by weight or less).

A core 4 constituted by a small bar or sheet of the product currently known as "soft caramel" is disposed inside the hydrated mass of filling 3. As is well known to experts in the art, this is a food mass manufactured from a mixture of caramel and condensed milk, possibly with the addition of hazelnut paste, vegetable fats, cows' butter, and flavorings.

The casing of the product constituted by the two wafer half-shells 2 coupled facing one another is covered by a coating layer 5 constituted, according to a preferred embodiment of the invention, by a so-called continuous coating which covers the entire outer surface of the half-shells 2 without any discontinuity. This is preferably a coating of chocolate or of a similar product. According to a solution which has been found particularly advantageous, the coating layer 5 is actually constituted by a so-called double layer, that is to say, by a first coating of chocolate in which chopped hazelnuts are dispersed and which is applied in contact with the wafer casing, covered by a second layer of chocolate having, amongst other things, the function of completely covering any tips of the chopped nuts which accidentally remain exposed to the air when the first coating layer is deposited.

The product 1 according to the invention is produced by a sequence of steps widely known in the art.

After the two wafer half-shells 2 have been produced, they are filled (typically by pouring) up to the edges of their openings with respective portions of a mass of filling 3. The small bar or sheet of soft caramel 4 (produced according to criteria widely known in the art) is then deposited in a central position on the respective mass of filling in one of the two filled half-shells to be coupled to form each product. The two filled half-shells are then coupled in positions facing one another (usually with the use of complementary, tiltable half-dies; for a description of dies of this type see, for example, the document EP-A-0 083 324 already mentioned above). The two coupled, filled half-shells are held together by the adhesive force of the respective half-masses of filling. The application of the outer coating 5 carried out by techniques widely known in the art) consolidates the cohesion of the product 1.

As indicated in the introductory portion of the present description, the simultaneous presence of the three components, wafer/hydrated filling/soft caramel in a close relationship causes a migration of moisture to take place from the moist mass of filling towards the soft caramel core and towards the wafers, such that when the moisture in the entire product reaches equilibrium in its three components they assume the correct structural consistency which gives the entire product the consistency and the ability to be swallowed sought, in particular, preventing the moisture from having harmful effects on the wafer. Clearly, the reference to "a close relationship" should be understood in the sense that the three components (particularly the wafer and the soft caramel) should be disposed facing one another and sufficiently close together to give rise to the desired effect of propagation of the moisture and to the achievement of the equilibrium described above.

Naturally, the principle of the invention remaining the same, the details of construction and forms of embodiment may be varied widely with respect to those described and illustrated, without thereby departing from the scope of the present invention. This applies in particular as far as the following elements/characteristics are concerned:

the structure of the wafer shell: in the context of the present invention, the term "shell" is not intended to be limited to hemispherical or concave closed structures but indicates any flat or curved structure in general which can constitute a kind of form (shell) for supporting a creamy filling or coating;

the nature and composition of the mass of filling 3, which may not even be uniform (for example, with different formulations' in one half shell 2 and in the other) as long as it remains of a hydrated or substantially hydrated character at least as far as the mass of filling of one of the two half-shells 2 is concerned, the shape and position of the soft caramel core 4, although the central position shown in the appended drawings has been found preferable, and the nature of the coating layer 5: in particular, this coating may be formed by a substance other than chocolate.

What is claimed is:

1. A food product with a wafer shell and a creamy filling, characterized in that:

the filling comprises a substantially hydrated mass in direct contact with the wafer shell, a core comprising a mixture of caramel and condensed milk is located within the filling, and a continuous coating is provided which covers the wafer shell in a position opposite the filling;

wherein said filling and said core are configured such that moisture migration takes place therebetween so as to achieve a desired food product consistency.

2. The food product according to claim 1, characterized in that the mass of filling is constituted by a milk-based cream.

3. The food product according to claim 1, characterized in that the shell comprises at least two wafer half-shells coupled facing one another.

4. The food product according to claim 1, characterized in that the coating covers the outer surfaces of the food product entirely.

5. The food product according to claim 1, characterized in that the coating includes a chocolate based layer.

6. The food product according to claim 1, characterized in that the coating comprises a granulated material.

7. The food product according to claim 6, characterized in that the granulated material is produced from at least one substance selected from the group consisting of: hazelnuts, almonds, meringues or mixtures thereof.

8. The food product according to claim 1, characterized in that the coating is a double-layer coating.

9. The food product according to claim 6, characterized in that the coating is a double-layer coating with the granulated material dispersed in the layer adjacent the shell.

10. The food product according to claim 2, characterized in that the shell comprises at least two wafer half-shells coupled facing one another.

11. The food product according to claim 4, characterized in that the coating includes a chocolate based layer.

12. The food product according to claim 4, characterized in that the coating comprises a granulated material.

13. The food product according to claim 5, characterized in that the coating comprises a granulated material.

14. The food product according to claim 12, characterized in that the granulated material is produced from at least one substance selected from the group consisting of: hazelnuts, almonds, meringues or mixtures thereof.

15. The food product according to claim 13, characterized in that the granulated material is produced from at least one substance selected from the group consisting of: hazelnuts, almonds, meringues or mixtures thereof.

16. A method of reducing moisture in a wafer of a food product having a creamy filling, comprising the steps of:

a) providing a creamy filling, comprising a substantially hydrated mass, within and in direct contact with an outer wafer shell;

b) causing migration of moisture from said creamy filling away from said wafer shell by providing a core comprising a mixture of caramel and condensed milk within said filling, and c) providing a continuous coating covering the wafer shell on a side of said wafer opposite said filling.

17. The food product according to claim 1, characterized in that the core further comprises at least one substance selected from the group consisting of: hazelnut paste, vegetable fats, cows' butter and flavorings.

* * * * *